Patented June 23, 1953

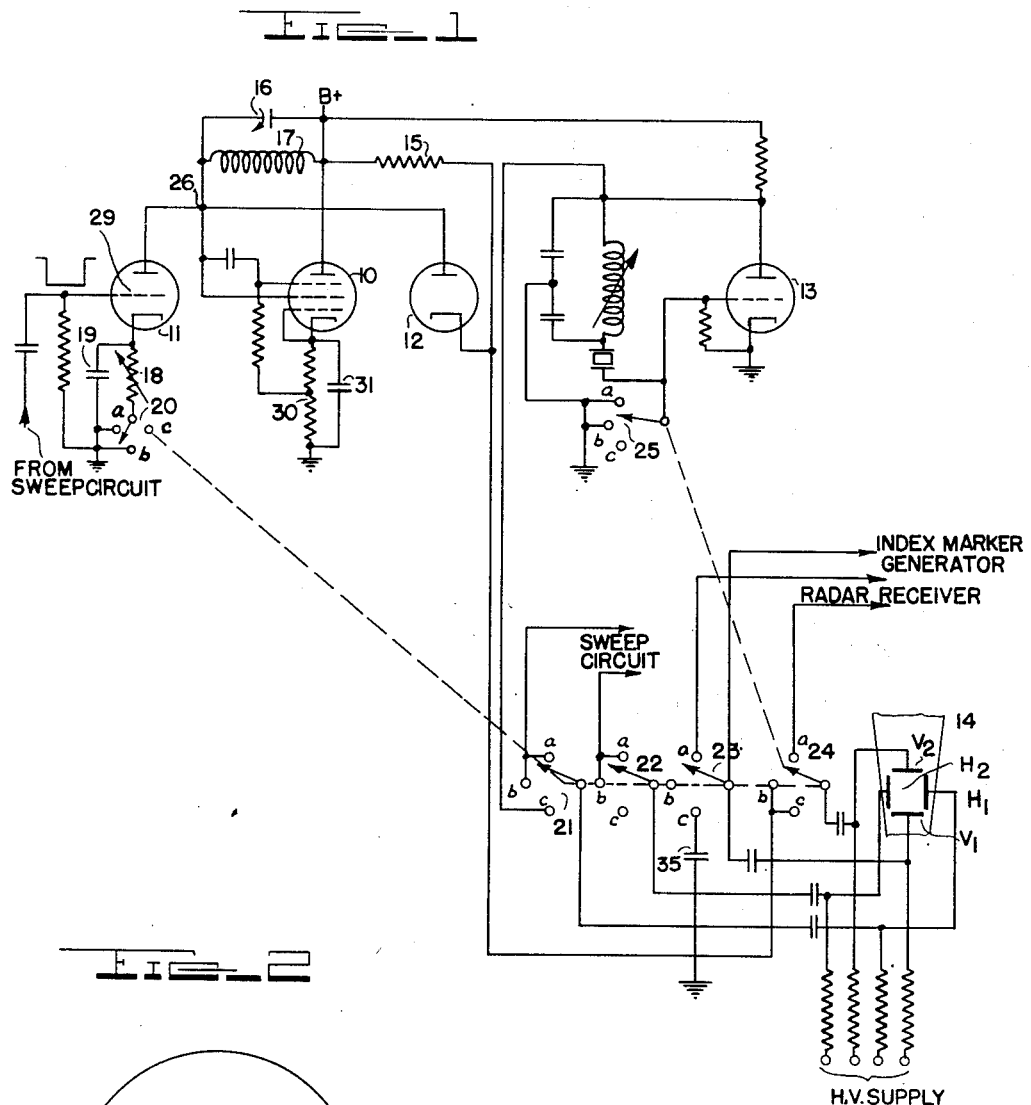

2,643,288

UNITED STATES PATENT OFFICE 2,643,288

CALIBRATING APPARATUS

La Verne R. Philpott, Washington, D. C.

Application May 25, 1944, Serial No. 537,286

6 Claims. (Cl. 175—381)

(Granted under Title 35, U. S. Code (1952), sec. 266)

This invention relates broadly to a method of and a means for graduating the time trace on a cathode ray oscilloscope and more particularly to a means for calibrating those precision timing instruments that employ a movable index marker disposed on the linear time trace of an oscilloscope.

In general, movable index markers of this character may be produced by any one of a number of circuits now made available by the prior art. A delay multivibrator containing a graduated potentiometer disposed in one of the grid legs may serve as one example of such a circuit, or a suitably graduated phase shifting device may serve as another example. These or similar schemes have in the past been quite favorably used to measure small intervals of time, especially in radio echo detection systems wherein the means for shifting the time phase of the index marker is graduated in range rather than time. In the use of these systems it becomes necessary, however, to provide a means for initially graduating the index marker generator as well as for checking from time to time its operating performance including reliability, accuracy and linearity. It is therefore an object of this invention to provide a means for calibrating those precision time measuring instruments that employ a movable index marker disposed on the trace of an oscilloscope.

It is another object of this invention to provide a means for producing a series of equally spaced and accurately known time markers on the time trace of a cathode ray oscilloscope.

It is another object of this invention to provide a means for producing a series of equally spaced and accurately known time markers on the time trace of a cathode ray oscilloscope with means for periodically checking the reliability of the means producing said time markers.

Another object of this invention is to provide a means which is readily adaptable to radio echo detection systems for use in calibrating the precision range indicator associated therewith.

Other objects and features of the present invention will become apparent upon a careful consideration of the following detailed description when taken together with the accompanying drawings, the figures of which represent a preferred embodiment of the invention.

Fig. 1 is a schematic diagram of a preferred embodiment of the invention, and Fig. 2 is a face view of a cathode ray oscilloscope illustrating typically the relationship between a movable index marker and a series of time marker signals produced on the electron beam trace thereof by the apparatus displayed in Fig. 1.

Reference is now had more particularly to Fig. 1 wherein there is shown a preferred embodiment of the invention, comprising a tuned oscillator 10 which is adapted to produce a series of equally spaced time marker signals and a cathode ray tube 14 upon which there is to be disposed both the variable phase index marker and the marker signals from which the accuracy of the variable phase index marker generator is to be observed. Also provided is a keying tube 11 arranged to initiate the operation of oscillator 10 synchronously with the inception of the cathode ray beam sweep, the means for producing the same not being shown, and a crystal controlled oscillator 13 which is adapted to provide a check on the frequency of operation of oscillator 10. For use in producing marker signals I have found it advantageous to employ an oscillator 10 of the transitron variety which is capable of generating a substantially pure sine wave output. Also, by the arrangement shown, the transitron may be so biased, by means of the condenser 31 resistance 30 arrangement disposed in its cathode circuit as to draw a quiescent current equivalent to its operational current which thus removes the burden on the operational current to charge the various condensers in the circuit during the inception of operation, and hence the distortion of the output wave caused thereby.

During the process of calibrating the index marker generator it is not only essential to maintain on the cathode ray tube the same relative positions of the marker signals but also exact and equal spacing between them. To achieve the above results, transitron 10 should be so keyed as to initiate each train of oscillations in zero phase and in such a manner as to always swing point 26 in the same sense obtaining full amplitude during the first half cycle of output. For this reason the keying tube 11 is provided, containing a self biasing circuit comprising capacitance 19 and resistance 18 disposed in the cathode circuit thereof having such proportions as to normally cause tube 11 to draw an appreciable current through the inductance 17 of the transitron tank circuit. In this condition the transitron is held inoperative. Application of a negative gate pulse to grid 29 renders the keying tube 11 non-conducting to cause a cessation of current through inductance 17 and in consequence an instantaneous inception of oscillations with point 26 always swinging positively from zero phase. Similarly resistance 18 may be adjusted so that the current normally drawn through inductance 17 by tube 11 equals the oscillation current flowing through this inductance, thereby assuring the attainment of full oscillation amplitude during the first half cycle of output.

Oscillations will then be sustained during the blocked period of the keying tube 11, after which the flood of current through inductance 17 will be restored, thus causing a rapid quenching of oscillations. The output from transitron 10 is then applied through either contacts $b$ or $c$ of the multiple throw switch 24 to the vertical deflecting electrode $V_2$ of the cathode ray tube 14. Equal spacing between the marker signals is then produced by a diode rectifier 12, connected in shunt with the tank circuit, of the transitron so as to provide the vertical deflecting electrode $V_2$ with signals of only one polarity, in this case positive pulses. Thus each marker is separated from the other by a half cycle of oscillation. The action of the diode rectifier 12 may produce excessive rectified currents which tend to damp the output from the transitron 10, this may be avoided by the use of a current limiting resistance 15 connected in series with the tank circuit and the cathode of the diode 12. This resistance also serves as a load for the oscillator across which its output may be taken.

In the normal use of the oscilloscope 14, that is, when certain signals are to be timed, such as radio echo detection pulses, all of the multiple throw switches 20, 21, 22, 23, 24 and 25 which are commonly ganged are set in the $a$ position. In this position a linear sweep derived from the sweep generator, not shown here, is applied to the horizontal deflecting plates $H_1$ and $H_2$ through switches 21 and 22 respectively, while the radar pulses derived from the radar receiver and the index marker obtained from its generator are applied to the vertical deflecting plates through switches 23 and 24. To calibrate the index marker generator the switches are adjusted to the $b$ position. In this position the linear sweep is again applied to the horizontal deflecting plates $H_1$ and $H_2$ while the series of equally spaced time markers derived from the transitron 10 is applied to the vertical deflecting plate $V_2$ through switch 24 and the index marker whose linearity and accuracy it is desired to observe is applied to the vertical deflecting electrode $V_1$ through switch 23. Simultaneously with the initiation of the linear trace a negative pulse having a time length equal to the trace period and generally obtained from the sweep circuit is applied to the grid 29 of the keyer 11 thereby setting oscillator 10 in to operation. In radio echo detection apparatus the time marker generator is generally graduated in range, hence, by tuning the osciliator 10 to some prearranged frequency, say 41 kc., the time marker signals derived therefrom will appear at what corresponds to 4000 yard intervals. Thus the setting of the index marker generator observed upon attaining coincidence between the index marker and a time marker signal of known range may be compared. Consequently this system provides a visible means for making certain necessary adjustments in the index marker generator to correct for deviations between the index marker setting and the actual ranges as indicated by the time marker signals. A typical illustration of the appearance of the marker signals and the index markers on the time trace is shown in Fig. 2 at 27 and 28, respectively. Here the index marker 28 is of the step variety which may be obtained from a circuit similar to that disclosed in my patent application entitled "Sweep Circuit Generator," Ser. No. 539,373 filed June 8, 1944.

Since the accuracy of the calibration of the index marker circuit depends upon the accuracy of the time marker generator it becomes necessary to check from time to time the reliability of the latter. For this purpose a crystal controlled oscillator 13 is provided. This oscillator is tuned to operate at some harmonic frequency of the time marker generator 10, say for example twice this frequency. As the accuracy of the entire system is ultimately dependent upon the constancy of the output from the crystal oscillator 13 the crystal and certain related R. F. components may be disposed within a constant temperature oven, not shown here, so as to render the frequency output therefrom unaffected by variations in the ambient temperature.

To check the accuracy of the time marker generator 10 all of the ganged switches are set in a $c$ position. In this position the linear trace is removed from the oscilloscope, while the index marker pulse is bled to ground through capacitance 35 and the keyer tube 11 is rendered blocked by virtue of the unbled capacitor 19 in the cathode circuit. In this condition both oscillators 10 and 13 will run continuously, their outputs being applied to quadrature deflecting electrodes $V_2$ and $H_1$ respectively. Thus when the proper frequency relation between the two oscillators is attained a steady and known lissajous figure will appear on the scope. In this case a figure having two-to-one characteristic will appear since two-to-one frequency ratio exists. Deviations from this figure indicate that oscillator 10 is off frequency and should be corrected.

Although I have shown and described only certain and specific embodiments of the present invention I am fully aware of the many modifications possible thereof. Therefore this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. A method of calibrating a timing instrument of the type having a movable index marker disposed on the time trace of a cathode ray oscilloscope, which includes initiating the production of an undamped, discontinuous timing wave in synchronism with the production of said time trace maintaining said timing wave only for the period of said time trace, causing said timing wave to deflect the electron beam of said oscilloscope in a direction perpendicular to the direction of said time trace thereby producing equal interval time indications thereon, moving said index marker into coincidence with one of said time indications at a time, and calibrating said timing instrument in accordance with the time interval represented by those time indications with which the index marker is made to coincide.

2. A method of calibrating a timing instrument of the type having a movable index marker disposed on the time trace of a cathode ray oscilloscope, which includes initiating the production of an undamped, discontinuous timing wave in synchronism with the production of said time trace maintaining said timing wave only for the period of said time trace, subjecting said timing wave to half wave rectification, causing said rectified wave to deflect the electron beam of said oscilloscope in a direction perpendicular to the direction of said trace thereby producing equally spaced time indications thereon, moving said index marker into coincidence with one of said time indications at a time, and calibrating said timing instrument in accordance with the time interval represented by those time indications with which the index marker is made to coincide.

3. A method of calibrating a timing instrument of the type having a movable index marker disposed on the time trace of a cathode ray oscilloscope which includes first producing a timing wave, adjusting the frequency of said timing wave relative to a known and standard frequency, thereafter periodically keying said timing wave in synchronism with the production of the time trace on said oscilloscope to produce an undamped, discontinuous train of oscillations, causing said oscillations to deflect the electron beam of the oscilloscope in a direction perpendicular to the direction of said trace thus producing equally spaced time indications thereon, moving said index marker into coincidence with one of said time indications at a time, and calibrating said timing instrument in accordance with the time interval represented by those time indications with which the index marker is made to coincide.

4. A method of calibrating a timing instrument of the type having a movable index marker disposed on the time trace of a cathode ray oscilloscope, which includes first producing a timing wave, adjusting the frequency of said timing wave relative to a known and standard frequency, thereafter periodically keying said timing wave in synchronism with the production of the time trace on said oscilloscope to produce an undamped, discontinuous train of oscillations, subjecting said oscillations to half wave rectification, causing said rectified oscillations to deflect the electron beam of said oscilloscope in a direction perpendicular to the direction of said trace thereby producing equally spaced time indications thereon, moving said index marker into coincidence with one of said time indications at a time, and calibrating said timing instrument in accordance with the time interval represented by those time indications with which the index marker is made to coincide.

5. In a cathode ray tube timing instrument in which there is included a cathode ray tube and a beam sweeping circuit for periodically sweeping the electron beam of the cathode ray tube over a fixed timing locus, the combination comprising a keyable, regenerative oscillator, control circuit means coupled to said oscillator and said beam sweeping circuit for keying said oscillator into operation in synchronism with the generation of the time trace to produce an undamped, discontinuous train of oscillations, and means including a half wave rectifier for applying said oscillations to said cathode ray tube to deflect the electron beam thereof in a direction substantially perpendicular to the direction of the timing locus to thereby produce a series of equally spaced time indications thereon.

6. In a cathode ray tube timing system in which there is included a cathode ray tube and a beam sweeping circuit for periodically sweeping the electron beam of said cathode ray tube over a straight line timing locus, the combination of, a keyable, regenerative oscillator tuned to a frequency much higher than the sweep rate of the electron beam, a trigger circuit connected to said oscillator and to said beam sweeping circuit for keying said oscillator into operation in synchronism with the generation of the time trace, and means including a clipping circuit for applying the output of said oscillator to said cathode ray tube to deflect the electron beam thereof in a direction substantially perpendicularly to the timing locus to thereby produce a series of equally spaced time reference marks thereon.

LA VERNE R. PHILPOTT.

References Cited in the file of this patent

UNITED STATES PATENTS

| Number | Name | Date |
|---|---|---|
| 1,924,174 | Wolff | Aug. 29, 1933 |
| 2,103,090 | Plebanski | Dec. 21, 1937 |
| 2,118,414 | Moullin | May 24, 1938 |
| 2,121,359 | Luck | June 6, 1938 |
| 2,178,074 | Jakel et al. | Oct. 31, 1939 |
| 2,227,598 | Lyman et al. | Jan. 7, 1941 |
| 2,266,668 | Tubbs | Dec. 16, 1941 |
| 2,280,531 | Norgaad | Apr. 21, 1942 |
| 2,332,300 | Cook | Oct. 19, 1943 |
| 2,364,756 | Roberts | Dec. 12, 1944 |
| 2,414,477 | Meacham | Jan. 21, 1947 |
| 2,420,516 | Bischoff | May 13, 1947 |
| 2,426,216 | Hight | Aug. 26, 1947 |
| 2,432,196 | Hershberger | Dec. 9, 1947 |
| 2,438,904 | De Rosa | Apr. 6, 1948 |
| 2,477,615 | Isbister | Aug. 2, 1949 |

OTHER REFERENCES

Publication "Radar Electronic Fundamentals," Navships 900,016 Bureaul of Ships, Navy Dept., June 1944, page 300.